May 18, 1943.　　A. F. MITTERMAIER　　2,319,775
ELECTROMAGNETIC INDUCTION APPARATUS
Original Filed March 9, 1940
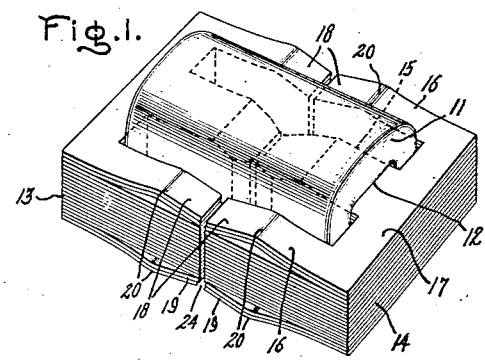
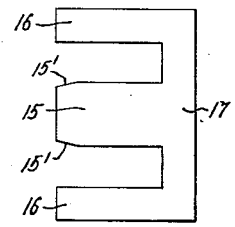
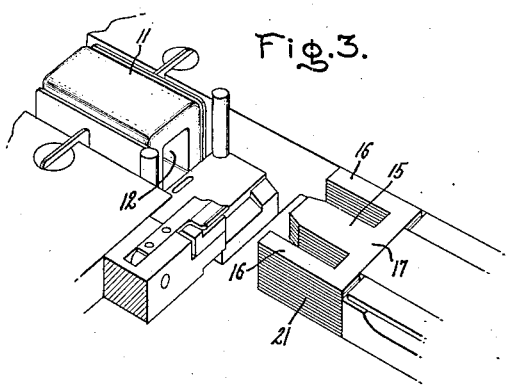
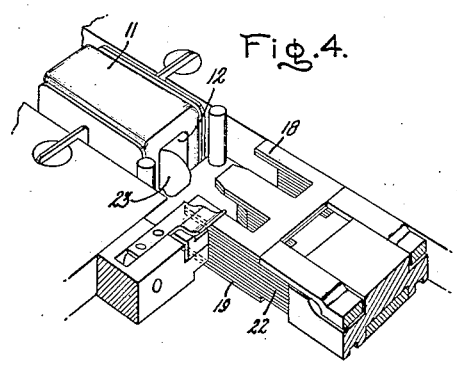
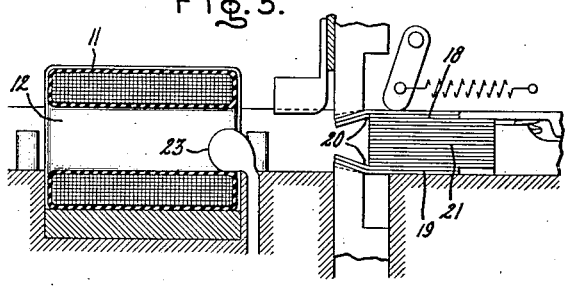
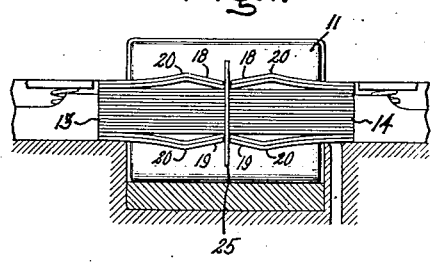
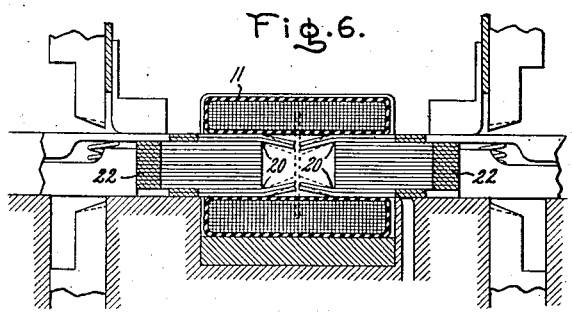
Inventor:
Armin F. Mittermaier,
by Harry E. Dunham
His Attorney.

Patented May 18, 1943

2,319,775

UNITED STATES PATENT OFFICE 2,319,775

ELECTROMAGNETIC INDUCTION APPARATUS

Armin F. Mittermaier, Fort Wayne, Ind., assignor to General Electric Company, a corporation of New York Original application March 9, 1940, Serial No. 323,235. Divided and this application September 5, 1940, Serial No. 355,525

6 Claims. (Cl. 175—356)

This application is a division of my copending application, Serial Number 323,235, filed March 9, 1940.

My invention relates to electromagnetic induction apparatus.

It is an object of my invention to provide improved, but less expensive electromagnetic induction apparatus, such as reactors and transformers in smaller sizes particularly. Another object of my invention is to provide such apparatus which shall be quiet, have its laminations of magnetic sheet material tightly locked without the use of clamps or wedges and shall have improved insulation characteristics and definitely fixed air gaps. Other and further objects and advantages will become apparent as the description proceeds.

In carrying out my invention in its preferred form I assemble stacked laminations with a preformed form-wound electrical coil. Two stacks of laminations are utilized which have legs projecting into the coil from opposite ends of the coil window and have a fixed air gap between the tip ends of the laminations. The laminations are E-shaped with the center legs of the E occupying the coil window, the yokes and outer legs of the E forming a shell surrounding the coil in a plane parallel to the electrical axis of the coil. For making a tight fit of the laminations in the coil window, the top and bottom pairs of laminations have their legs crimped or bent so that the springiness of the top and bottom laminations serves to clamp the laminations forming the core tightly together within the coil window as well as outside the coil window. The outside legs may be crimped slightly more than the inside legs in order to assure rigidity of the outside legs and freedom from vibration or noise in alternating current circuits.

The invention will be understood more readily from the following detailed description when considered in connection with the accompanying drawing and those features of the invention which are believed to be novel and patentable will be pointed out in the claims appended thereto.

In the drawing,

Figure 1 is a perspective view of a reactor constructed in accordance with one embodiment of my invention.

Figure 2 is a plan view of one of the E-shaped laminations employed in the apparatus of Figure 1.

Figures 3 and 4 are perspective views and 5–7, inclusive, are longitudinal sectional views partially schematic illustrating the electrical coil and the magnetic laminations in successive stages of the assembling process.

In the drawing, Figure 1 illustrates a completed device which may be either a reactor for use in apparatus such as fluorescent lamps or a transformer such as an audio transformer for radio purposes. In such types of apparatus it is desirable to maintain a certain predetermined air gap. For convenience the device will hereinafter be referred to as a reactor although my invention is not limited thereto. It comprises a conductive-winding structure or electrical coil 11 which is a preformed form-wound coil and may, therefore, be produced in a rapid, economical manner well known to the art with the requisite amount of insulation included therein. The coil 11 has a window for receiving a magnetic core. The complete magnetic circuit of the device illustrated in Figure 1 consists of magnetic core material substantially filling the coil window 12 and core material providing a magnetic return path around the outside of the coil 11. The magnetic circuit consists of a pair of E-shaped stacks of laminations 13 and 14. Each lamination of the stack is shown more in detail in Figure 2, having a middle leg or arm 15 which lies within the coil window, an outer leg or arm 16 and a yoke portion 17 joining the middle and outer legs. The end of the middle leg 15 of each lamination is preferably tapered as shown at 15' in order that the middle leg 15 may be guided into the coil window 12 more easily. In the manner which will be explained more in detail hereinafter laminations at the top and at the bottom, e. g., the top and bottom pairs of laminations 18 and 19 have the middle legs crimped toward each other to facilitate further guiding the middle leg of the group of laminations into the coil window. Although I have found it satisfactory to crimp two laminations at the top and two at the bottom of the group, my invention is not limited to this exact number. Not only the middle legs of the E-shaped laminations 18 and 19 but also the outer legs, as shown in Figure 1, may, if desired, be crimped for the purpose of causing the laminations to fit snugly into the coil window 12 and causing the outer legs 16 to be held tightly to prevent vibration and noise when an alternating current is applied to the electrical coil 11. The crimps in the outer legs are represented at 20 in Figure 1 and the middle legs have corresponding crimps. I have found it desirable to make the crimps in the outer legs somewhat sharper than the crimps in the middle arms.

One of the first steps in the method of assembling the laminations with the electrical coil consists briefly of gauging the requisite height of laminations to form half the core and to fill the coil window 12 substantially, thus forming a group of laminations 21 as illustrated in Figure 3. The top and bottom pairs of laminations 18 and 19 are placed against the other laminations in the group in such a manner that the ends of the legs of the E project beyond the remainder of the laminations 22 in the group. This stage is illustrated in Figure 4. The ends of the legs of the laminations are bent over to form the crimps 20, which is the stage illustrated in Figure 5. Then the laminations in the groups of laminations 21 as units have the middle legs inserted into the coil window as illustrated in Figure 6. Thereafter, the main middle portion 22 of the group of laminations is pushed in to follow the upper and lower pairs of laminations 18 and 19 so that all of the laminations are in alignment as illustrated in Figure 7, resulting in the completed apparatus illustrated in Figure 1. For the purpose of preventing longitudinal vibration of the laminations in the direction of the magnetic axis of the coil and thus overcoming noise from this source, a suitable nonmagnetic gap spacer may be inserted in the coil to fill the air gap. The gap spacer may be inserted either in solid or plastic form. Preferably before the laminations are inserted into an electrical coil a quantity of suitable cement 23 is placed opposite the coil window, as illustrated in Figure 5, or within the coil window so that the cement 23 will fill the space within the coil window not occupied by the magnetic material, thus making certain that the laminations are very tightly held and cannot vibrate within the coil window and that there are no air pockets to retain or collect air, moisture or substances which may interfere with the insulation or cause corrosion. My invention is not, however, limited to utilizing both the features of crimped lamination legs and cement filling, as a tight rigid construction may be made by the use of one of these features alone.

A more complete description of this method of forming the reactor together with a description of the apparatus employed in forming the reactor, portions of the apparatus being shown in Figures 3 to 7 inclusive, will be found in my above mentioned copending application which also contains claims directed to the method and apparatus.

If it is desired to fix the reactance of the reactor with a high degree of accuracy, the air gap 24 may be left slightly higher than the anticipated value by using a slightly thicker gap spacer 25, and the laminations may then be moved closer by means of a device o. ther suitable fixture having a fine screw to permit gradual shortening of the air gap until the proper value of reactance is obtained. If this procedure is carried out it must be done sufficiently soon after the reactor is removed from the assembling machine before the cement filling the window in the space between the laminations in the coil window has had an opportunity to harden. If the reactance is to be precisely adjusted in the manner just suggested, the coil may be connected in an electrical circuit for measuring reactance while the air gap is being given its final adjustment. In order to set the cement the reactor may be given a heat treatment, and to improve the insulating properties of the coil the reactors may thereafter be treated with rosin and finally impregnated with a suitable insulating compound, or the cement may be allowed to set while the coil is being treated.

My invention is not limited to any particular size of stationary induction apparatus. However, I have obtained satisfactory results pertaining to reactors for use with fluorescent lamps. In this case the core consists of about 20 laminations 1" x 1½", forming a ½" stack, with the center laminations about ½" wide and with the outer laminations about ¼" wide. The gap is made about .012 of an inch to produce a reactor of .71 henry for 15 watt 110 volt lamps and about .015 of an inch to produce a reactor of about .61 henry for 20 watt 110 volt lamps. A satisfactory composition of cement was found to be a mixture of 2 parts Portland cement by weight and 1 part of Bakelite varnish, designated by the Bakelite Company as BV-6509. The cement was found to penetrate well, strongly adhering to the lamination tips, which make a butt joint with the magnetic-gap-fixing cement between the lamination tips, and there was found to be no need for wedging or clamping of the laminations to obtain freedom from noise or vibration.

In accordance with the provisions of the patent statutes, I have described the principle of operation of my invention together with the apparatus which I now consider to represent the best embodiment thereof but I desire to have it understood that the apparatus shown is only illustrative and that the invention may be carried out by other means.

What I claim as new and desire to secure by Letters Patent of the United States is:

1. Electromagnetic induction apparatus comprising a form-wound conductive-winding structure or coil having a substantially rectangular window therein, a pair of groups of core laminations of E shape, and impregnating cement, the groups of laminations each having the middle legs of the E inserted in the coil window and extending toward the corresponding legs of the other group with a fixed gap between opposite leg tips, the middle leg substantially filling the coil window, the top and bottom laminations of the groups having their legs bent toward each other with the outer legs bent more than the inner legs, whereby the laminations are securely wedged in the coil window and the portions of the laminations both within and surrounding the coil are securely held together, whereby the laminations are locked and noise is prevented, the said cement impregnating the space within the coil window not occupied by the laminations.

2. Electromagnetic induction apparatus comprising a form-wound conductive winding structure or coil having a substantially rectangular window therein, a pair of groups of core laminations of E shape, the groups of laminations each having the middle legs of the E inserted in the coil window and extending toward the corresponding legs of the other group with a fixed gap between the tips of the opposite legs, the middle leg substantially filling the coil window, the top and bottom laminations of the groups having their legs bent towards each other, whereby the laminations are securely wedged in the coil winddow and the portions of the laminations both within and surrounding the coil are securely held together to provide locking for the laminations and prevention of noise.

3. Electromagnetic induction apparatus comprising a form-wound conductive winding structure or coil having a window therein to receive a magnetic core, a pair of groups of core laminations having leg portions adapted to fit in the conductive winding structure and gap spacing means, the groups of laminations each having the said legs inserted in the coil window and extending toward the corresponding legs of the other group with the tips of the opposite legs in tight contact with opposite sides of the gap spacing means, said legs substantially filling the coil window, the top and bottom laminations of the groups having their legs bent toward each other, whereby the laminations are securely wedged in the coil window, the groups of laminations are joined by the winding structure, and the portions of the laminations within the winding structure are securely held together preventing transverse or longitudinal vibration and attendant noise.

4. Electromagnetic induction apparatus comprising a form-wound conductive winding structure or coil having a window therein to receive a magnetic core, a pair of groups of core laminations having leg portions adapted to fit in the conductive winding structure, the groups of laminations each having the said legs inserted in the coil window and extending toward the corresponding legs of the other group with a fixed gap between the tips of the opposite legs, said legs substantially filling the coil window, the top and bottom laminations of the groups having their legs bent toward each other, whereby the laminations are securely wedged in the coil window, the groups of laminations are joined by the winding structure and the portions of the laminations within the winding structure are securely held together preventing noise and vibration.

5. Electromagnetic induction apparatus comprising a form-wound conductive winding structure, a coil having a substantially rectangular window therein, a group of core laminations of E shape having the middle legs of the E inserted in the coil window and substantially filling the coil window, the top and bottom laminations of the group having their legs bent toward each other with the outer arms bent more than the inner legs, whereby the inner legs are wedged in the coil window and the laminations both within and surrounding the coil are securely held together, whereby the laminations are locked and noise is prevented.

6. Electromagnetic induction apparatus comprising a conductive winding structure or coil having a substantially rectangular window therein, a group of core laminations of E shape having the middle legs of the E inserted in the coil window and substantially filling it, the laminations at the top and bottom of the group having legs which are bent toward each other to form crimps whereby the laminations are securely wedged in the coil window and are held together.

ARMIN F. MITTERMAIER.